United States Patent [19]

Coulmance et al.

[11] 4,088,871
[45] May 9, 1978

[54] POWER LIMITING DEVICE FOR AN ELECTRONICALLY CONTROLLED ELECTRIC HEATING SYSTEM

[75] Inventors: Jean-Pierre Rene Coulmance, Osny; Jean-Claude Gerard Six, Sevres, both of France

[73] Assignee: U.S. Philips Corporation, New York, N.Y.

[21] Appl. No.: 670,363

[22] Filed: Mar. 25, 1976

[30] Foreign Application Priority Data

Mar. 26, 1975 France .................................. 75 09448

[51] Int. Cl.² ............................................. H05B 1/02
[52] U.S. Cl. .................................... 219/497; 219/494; 219/501
[58] Field of Search ............... 219/490, 494, 497, 501, 219/504, 505; 323/68

[56] References Cited

U.S. PATENT DOCUMENTS

| | | | |
|---|---|---|---|
| 3,443,121 | 5/1969 | Weisbrod | 219/497 X |
| 3,821,516 | 6/1974 | Hayes et al. | 219/497 |

Primary Examiner—J. V. Truhe
Assistant Examiner—Fred E. Bell
Attorney, Agent, or Firm—Frank R. Trifari; Bernard Franzblau

[57] ABSTRACT

A power limiting device for an electric heating system electronically controlled by a modulating thermostat includes a bistable trigger circuit having an auxiliary temperature sensor preferably comprising a temperature dependent resistor. The trigger circuit controls the modulating thermostat to change the on/off ratio of the heating system as a function of a second temperature parameter to which the auxiliary temperature sensor responds.

10 Claims, 5 Drawing Figures

POWER LIMITING DEVICE FOR AN ELECTRONICALLY CONTROLLED ELECTRIC HEATING SYSTEM

The present invention relates to a power limiter for an electric heating system which is electronically controlled by means of a modulating thermostat of the type which comprises a direct voltage stabilizer, a zero passage detector, a differential amplifier, a ramp generator comprising a resistor and a capacitor, and an output amplifier.

This type of thermostat, which was originally used in industry, more and more tends to take the place of conventional thermostats in all applications of individual or collective electric heating. Apart from its intrinsic qualities of reliability and precision, its greater use occurs mainly because it is available in the form of a monolithic integrated circuit, such as that which is commercially available from N. V. Philips Gloeilampenfabrieken under the designation "TCA 280A."

The operation of such a thermostat is very simple: to the input an external sensor is connected which is constituted by a resistor with a high temperature coefficient. The output controls the control electrode of a thyristor or a triac which is connected in series with the heating resistor. The power dissipated by the resistor is modulated in time so as to maintain the temperature of the sensor (or control temperature) constant.

In the specific case of electric heating of an apartment, in which the sensor measures the temperature inside the room, this system may lead to a waste of energy when the user opens a window of his apartment because at that moment the system responds by an additional power take-off which is to compensate for the loss of heat thus caused. If the difference between the indoor and the outdoor temperature is comparatively small, control is again effected at the expense of a substantial increase in power consumption.

In this case it is desirable that the opening of a window cannot lead to a power take-off which is proportional to the loss of heat. Instead the user is forced either to accept a substantial drop-in indoor temperature or to close the window.

Another cause of power wastage may result from the use of electric heating by accumulation. If all the heat stored at night in the "slack hours" is not used during the day, there will be a waste of power during subsequent re-charging. In this case it is also desirable that the average heating power of the refractory block can be modulated as a function of the residual heat of the latter.

It is one of the objects of the invention to add a circuit to the modulating electronic thermostat, which circuit enables the electric power which is controlled by said thermostat to be limited in certain cases.

According to the invention, the power limiting device of an electric heating system which is electronically controlled by means of a modulating thermostat of the type which comprises a direct voltage stabilizer, a zero passage detector, a differential amplifier, a ramp generator comprising a resistor and a capacitor, and an output amplifier, is characterized in that the resistor of the ramp generator is divided into two branches which are respectively connected to the collectors of two transistors which are connected as a bistable trigger circuit. One of said branches comprises at least a resistor with a high temperature coefficient. The collector of the transistor which corresponds to the branch which comprises the resistor with a high temperature coefficient is connected to a d.c. supply terminal of the output amplifier. The interconnected emitters of the two transistors are furthermore connected to a signal output terminal of the ramp generator.

Advantageously, the resistor with a high temperature coefficient is a resistor with a negative temperature coefficient (NTC) connected in series with a variable resistor.

As the state of the trigger circuit changes at the end of each sawtooth, the period thereof may alternately have two values, one fixed value and another value which is variable as a function of the temperature of the NTC resistor. As the output amplifier is only energized during the variable periods, the on/off ratio of the thyristor or triac which is controlled by said amplifier consequently varies in a corresponding manner. By arranging the NTC resistor at a suitably selected location, the heating power can be modulated as a function of the temperature at said location, while still maintaining the normal control process of the modulating thermostat.

The power limiting device in accordance with the invention bears a certain similarity to another device which is described in the applicant's copending U.S. patent application Ser. No. 670,364 filed simultaneously with the present application.

The following description, when read in conjunction with the drawing, will clarify how the invention can be realized.

Figure 1:
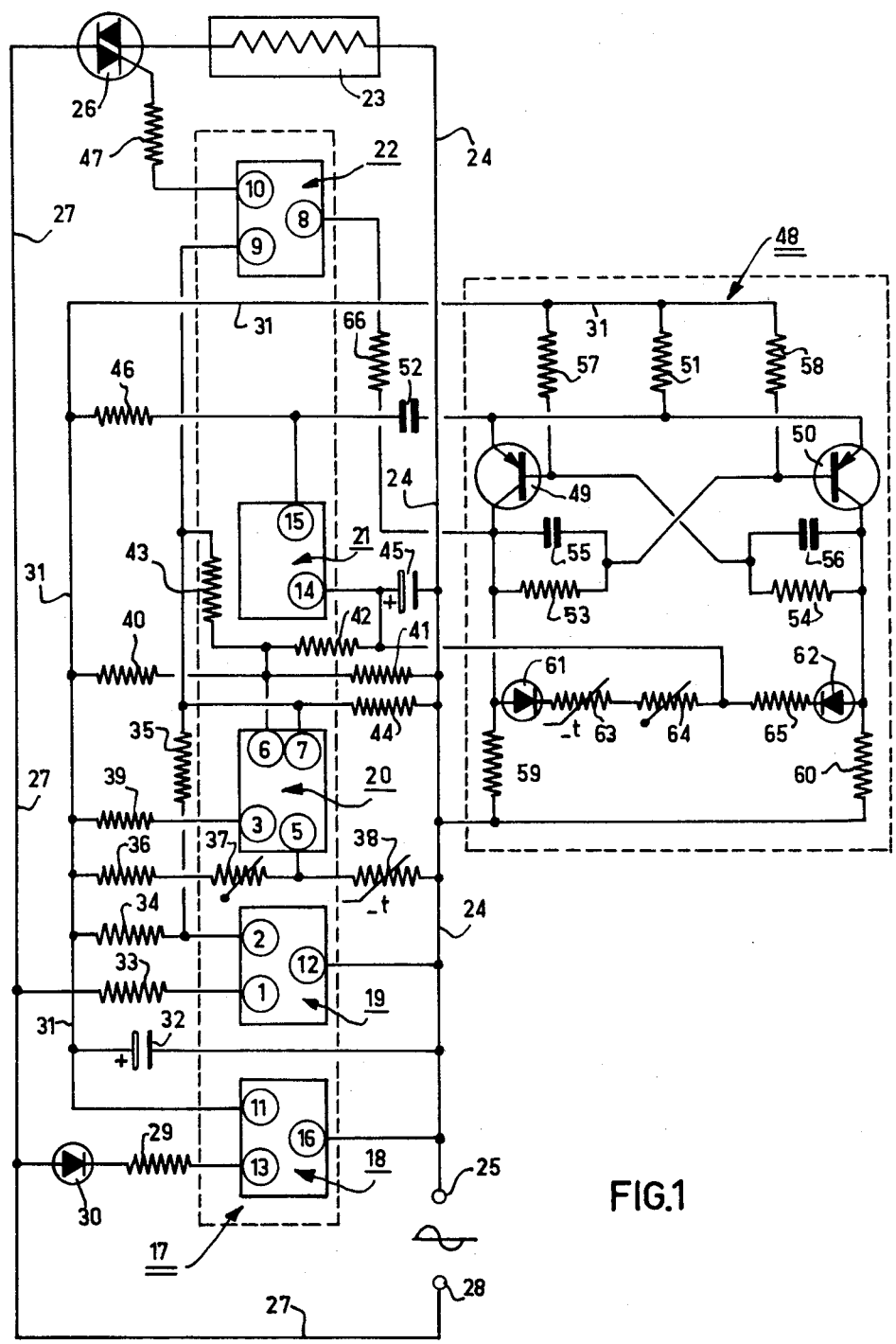
FIG. 1 shows the circuit diagram of the power limiting device in accordance with the invention, which co-operates with a modulating electronic thermostat.

In FIG. 1 a monolithic integrated circuit 17 of the TCA 280A type, shown in a dashed box, comprises a voltage stabilizer 18, a zero-passage detector 19, a differential amplifier 20, a ramp generator 21, and an output amplifier 22. The input or output terminals of the integrated circuit 17 are represented by a circle in each of the blocks corresponding to the said functions.

One end of a heating resistor 23 is connected directly to a conductor 24 which is connected to a neutral voltage supply terminal 25, and the other end is connected via a triac 26 to a conductor 27 which in turn is connected to a phase terminal 28 of said mains.

The input 13 of the voltage stabilizer 18 is connected to the cathode of a rectifier diode 30 via a resistor 29, the anode of said diode being connected to the conductor 27.

The positive stabilized-voltage output 11 of the circuit 18 is connected to a conductor 31, the negative output 16 being connected to the neutral conductor 24. Between the conductors 24 and 31 an electrolytic filtering capacitor 32 is connected.

The input 1 of the zero-passage detector circuit 19 is connected to the conductor 27 via a resistor 33, while the input 12 is connected to the neutral conductor 24. The output 2 is connected both to the conductor 27 via a first resistor 34, and to the input 9 of the output amplifier 22 via a second resistor 35.

Between the positive conductor 27 and the neutral conductor 24 a chain is included which comprises a fixed resistor 36, a variable resistor 37, and a resistor 38 with a negative temperature coefficient (NTC).

The supply input 3 of the differential amplifier 20 is connected to the conductor 31 via a resistor 39, whereas the first signal input 5 is connected to a common point of the variable resistor 37 and the NTC resistor 38 second signal input 6 is connected to the conductor 31, to the conductor 24, to the input 14 of the ramp generator 21 and to the input 9 of the output amplifier 22 via the four resistors 40, 41, 42 and 43 respectively.

The output 7 of the differential amplifier 20 is connected both to the neutral conductor 24 via a resistor 44, and directly to the input 9 of amplifier 22.

An electrolytic capacitor 45 is included between the conductor 24 and the input 14 of the ramp generator, whereas the output 15 of said generator is connected to the conductor 31 via a resistor 46. The control electrode of the triac 26 is connected to the output 10 of the output amplifier 22 via a resistor 47.

The power limiting device 48 in accordance with the invention comprises two transistors 49 and 50 of the PNP type having interconnected emitters which are connected both to the conductor 31 via a resistor 51, and to the output 15 of the ramp generator 21 via a capacitor 52.

The bases and collectors of the transistors 49 and 50 are cross-coupled via two resistors 53 and 54 which are respectively shunted by two capacitors 55 and 56.

The bases of the transistors 49 and 50 are furthermore connected to the conductor 31 via two resistors 57 and 58 respectively, while the collectors are connected to the neutral conductor 24 via two resistors 59 and 60 respectively.

The anodes of the two blocking diodes 61 and 62 are respectively connected to the collectors of the transistors 49 and 50, while a chain comprising an NTC resistor 63, a variable resistor 64, and a fixed resistor 65 is included between the cathodes of said diodes. Furthermore, the common point of the resistors 64 and 65 is connected to the input terminal 14 of the ramp generator 21, while the collector of the transistor 49 is connected to the supply terminal 8 of the output amplifier 22 via a resistor 66.

The operation of the modulating thermostat 17 with which the device is equipped is well-known. A sawtooth (or ramp) signal which is applied to the input 6 of the differential amplifier 20 is compared with a variable direct voltage which is applied to the input 5 of said amplifier. Depending on whether the direct voltage applied to 5 is higher of lower than the instantaneous voltage applied to 6, the triac 26 is either conductive or cut off.

The value of the direct voltage applied to input 5 is a function of the value of the NTC resistor 38 which functions as a thermostat sensor for the ambient temperature, the desired control temperature being adjusted by means of the variable resistor 37.

According as the temperature of the sensor 38 approximates the control points more closely, the on/off ratio of the triac 26 decreases, the triac being turned off completely when said temperature is reached.

The period of the sawtooth has been chosen slightly smaller than that of the thermal time constant of the assembly to be controlled in order to make the temperature fluctuations negligible.

In order to avoid the generation of RF interference, the detector circuit 19 ensures that the triac 26 is turned on/off during the zero passage of the sinusoidal supply current.

The power limiting device 48 in accordance with the invention which, co-operates with the modulating thermostat 17, operates as follows: the trailing edge of each of the sawtooth signals from the ramp generator 21 causes the state of the trigger circuit 48 to be changed so that the charging current of the capacitor 45 follows one of two different paths, depending on the state of said trigger circuit. When the transistor 49 is bottomed, said charging current passes via the resistor 51, the transistor 49, the diode 61, the NTC resistor 63, and the variable resistor 64. In the other state, the charging current passes through the resistor 51, the transistor 50, the diode 62, and the resistor 65.

When the trigger circuit is in the first state, the slope of the sawtooth changes as a function of the rate of charging of the capacitor 45, and thus of the temperature of the NTC resistor 63. However, in the second state the slope of the sawtooth is fixed.

Figure 2:
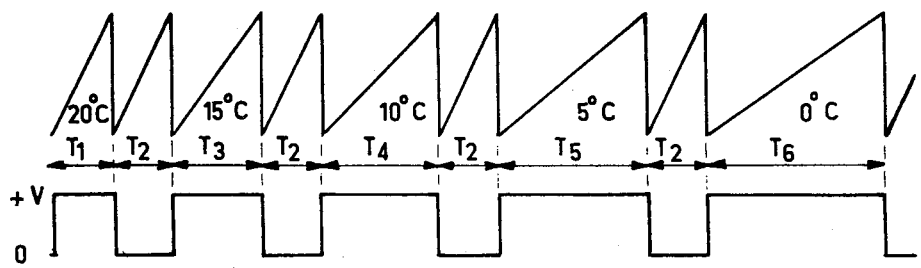
FIG. 2 shows the sawtooth signals supplied by the ramp generator, as well as the corresponding supply voltage variations of the output amplifier.

In the upper diagram of FIG. 2, the shape of the sawtooth is shown when the temperature of the NTC-resistor 63 varies from 20° to 0° C.

In the first state, and at 20° C, the sawtooth has a period with a value $T_1$, followed by a period with a value $T_2$ in the second state. Successively, the periods corresponding to the first state assume the values $T_3$ at 15° C, $T_4$ at 10° C, $T_5$ at 5° C, and $T_6$ at 0° C, separated by periods $T_2$ of fixed value in the second state.

As the supply terminal 8 of the output amplifier 22 is connected to the collector of transistor 49, the voltage thereof changes from the value + V in the first state of the trigger circuit to a value near zero in the second state (FIG. 2, lower diagram). Thus, the amplifier 22 can only energize the control electrode of the triac 26 in the first state of the trigger circuit in which the slope of the sawtooth varies as a function of the temperature of the NTC resistor 63. If this resistor is, for example, disposed outside a building, the maximum on/off ratio of the triac 26 will vary as a function of the outdoor temperature. If the power requirement increases owing to a rapid drop of the temperature of the indoor sensor 38, for example, if a window has been opened, the maximum available power will be limited.

Figure 3:
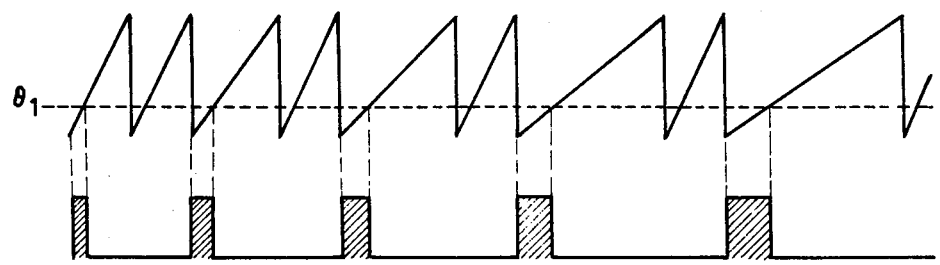
FIGS. 3, 4 and 5 show the variation in on/off ratio for three different control temperatures.
Figure 4:
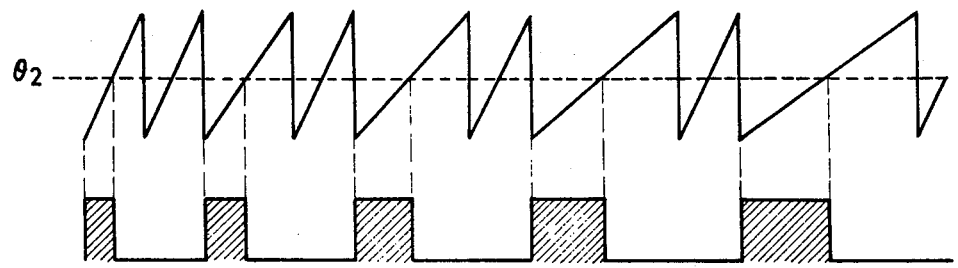
Figure 5:
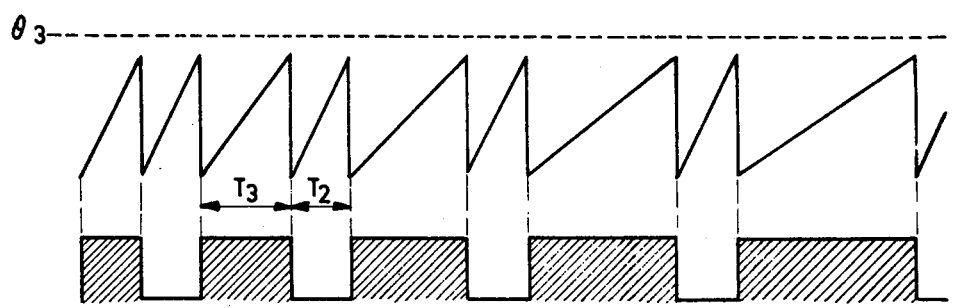

In FIGS. 3, 4 and 5, the conduction periods of the triac 26 at three temperature $\theta_1$, $\theta_2$ and $\theta_3$ of the indoor sensor 38 are represented for the same variation of the sawtooth waveforms as in FIG. 2. When maximum power is not required (FIGS. 3 and 4) control is effected normally. However, when the temperature $\theta_3$ (FIG. 5), of the indoor sensor 38 decreases to such a value that full power is needed, the on/off ratio of the triac 26 cannot exceed $T_3/T_4$ when for example temperature of the outdoor sensor 63 is 15° C.

Another application of the power limiting device in accordance with the invention is found in the field of electric accumulation heating systems. By disposing the sensor 63 in the centre of the refractory mass of the radiator, the average power applied to said mass during the charging mode in the slack hours is limited from the very beginning, when all the heat stored has not been utilized in the radiation mode, which is frequently the case in between seasons.

It is evident that for calculating the maximum power of the installations allowance should be made for the time $T_2$ during which the triac 26 cannot be energized.

What is claimed is:

1. A power limiting device for an electric heating system electronically controlled by means of a modulating thermostat of the type which comprises a direct voltage stabilizer, a zero-passage detector, a differential amplifier, a ramp generator comprising resistor means and a capacitor, and an output amplifier, the improvement being characterized in that the resistor means of the ramp generator is divided into two branches which are respectively connected to the collectors of two transistors connected as a bistable trigger circuit and with their emitters interconnected, one of said branches comprising at least a resistor with a high temperature coefficient, and in that the collector of the transistor connected to the branch which comprises the resistor with a high temperature coefficient is connected to a d.c. supply terminal of the output amplifier, and means connecting the interconnected emitters of the two transistors to a signal output terminal of the ramp generator.

2. A power limiting device as claimed in claim 1, further comprising a variable resistor connected in series with the resistor with a high temperature coefficient.

3. A power limiting device as claimed in claim 1 further comprising means connecting each of the branches to the collectors of the respective transistors via individual semiconductor diodes each of which is poled in the forward direction when the corresponding transistor is in the saturated state.

4. A power limiting device as claimed in claim 1 wherein the modulating thermostat further comprises, means connecting an output terminal of the voltage stabilizer to the zero-passage detector, the differential amplifier and the ramp generator, means connecting an output terminal of the zero-passage detector to an input terminal of said output amplifier, means connecting first and second input terminals of the differential amplifier to a terminal of the ramp generator and to a second temperature dependent resistor, respectively, means connecting an output terminal of the differential amplifier to the input terminal of the output amplifier, and means connecting said resistor means and said capacitor to an input terminal of the ramp generator.

5. Apparatus for sensing and regulating temperature comprising, a pair of input terminals for connection to a source of supply voltage, a control element coupled to said input terminals and having a control electrode for adjusting the on/off time thereof, a first temperature sensing element, an amplifier having an output terminal coupled to the control electrode of the control element to control its on/off time, control means responsive to a temperature control signal derived by said first temperature sensing element for supplying a temperature controlled signal to an input of said amplifier, a capacitor, a ramp generator having an input connected to said capacitor, a bistable trigger circuit having first and second current paths for coupling a source of DC voltage to said capacitor, the first current path including a first transistor and a temperature sensitive resistor serially connected and the second current path including a second transistor serially connected with a resistor relatively insensitive to temperature, means coupling a signal output terminal of the ramp generator to an input of the bistable trigger circuit, and means coupling the DC voltage supply terminal of the amplifier to the output electrode of the first transistor of the bistable trigger circuit thereby to control the on/off time of the amplifier as a function of the temperature sensed by the temperature sensitive resistor.

6. Apparatus as claimed in claim 5 wherein said control means comprises a differential amplifier having a first input coupled to said first temperature sensing element, a second input coupled to receive a ramp signal from the ramp generator, and an output for supplying said temperature controlled signal to said input of the amplifier.

7. Apparatus as claimed in claim 5 further comprising means for cross-coupling said first and second transistors to produce a bistable circuit operation.

8. Apparatus as claimed in claim 5 further comprising a heating element serially connected with said control element across the input terminals, and a zero passage detector having an input coupled to said input terminals and an output coupled to the input of the amplifier, and wherein the input terminals are adapted to be connected to a source of AC supply voltage.

9. Apparatus as claimed in claim 5 wherein the resistance of the first current path varies with the temperature being sensed by the temperature dependent resistor thereby to vary the time period of alternate cycles of the ramp signal thereby to vary the period of alternate half cycles of a rectangular waveform signal developed at the first transistor output electrode, and wherein the resistance of the resistor in the second current path remains substantially constant whereby the other alternate cycles of the ramp signal have a fixed period as does the other alternate half cycles of said rectangular waveform signal.

10. Apparatus as claimed in claim 5 further comprising first and second diodes serially connected in said first and second current paths, respectively.

* * * * *